Feb. 23, 1960   J. P. LINDSEY   2,926,331
SEISMIC EXPLORATION
Filed Feb. 4, 1957   4 Sheets-Sheet 1
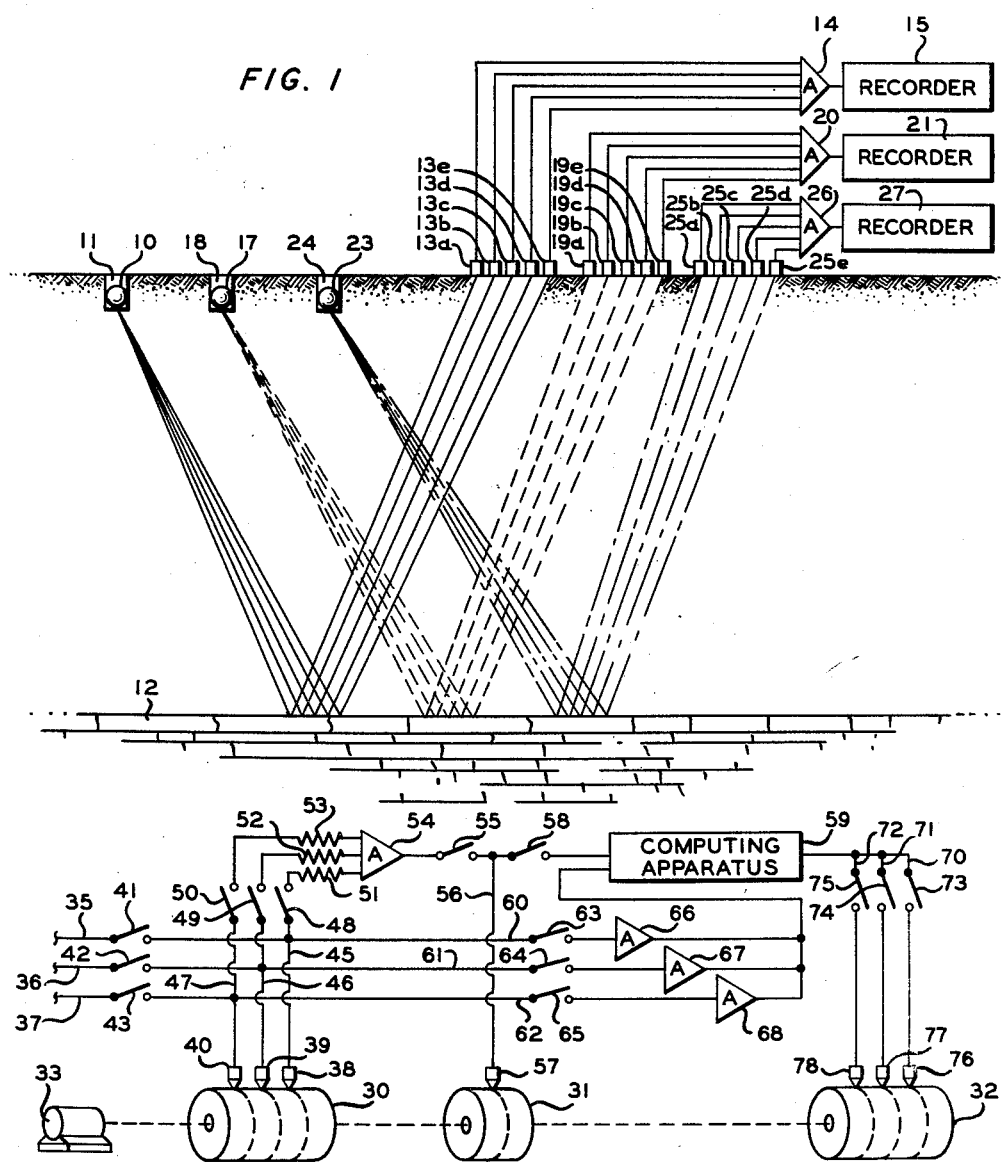
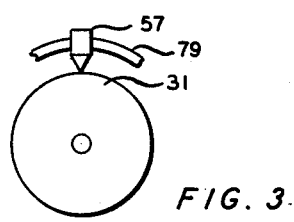
FIG. 3.
INVENTOR.
J. P. LINDSEY
BY Hudson + Young
ATTORNEYS

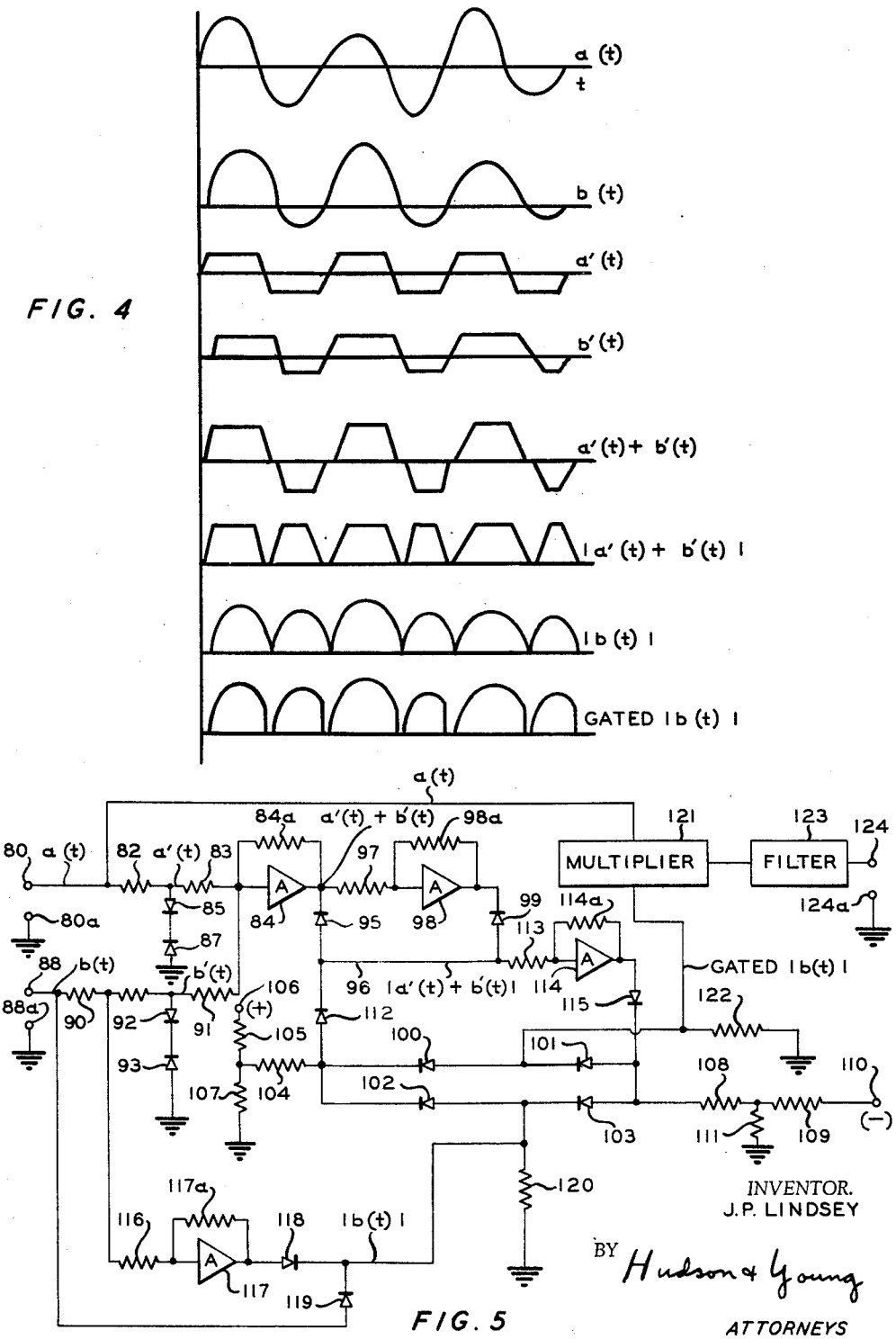

INVENTOR.
J. P. LINDSEY
BY Hudson & Young
ATTORNEYS

Feb. 23, 1960 J. P. LINDSEY 2,926,331
SEISMIC EXPLORATION
Filed Feb. 4, 1957 4 Sheets-Sheet 4

INVENTOR.
J. P. LINDSEY
BY Hudson & Young
ATTORNEYS

United States Patent Office 2,926,331
Patented Feb. 23, 1960

2,926,331

SEISMIC EXPLORATION

Joe P. Lindsey, Bartlesville, Okla., assignor to Phillips Petroleum Company, a corporation of Delaware Application February 4, 1957, Serial No. 638,138

10 Claims. (Cl. 340—15)

This invention relates to seismic exploration and to the interpretation of seismic signals.

Seismic exploration refers to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot holes. The vibrations incident upon the seismometers are converted into corresponding electrical signals which are amplified and recorded. By noting the relative arrival times of selected reflected vibrations in a plurality of records, it is possible to obtain valuable information regarding the depth and slope of subterranean reflecting beds. However, extraneous vibrations usually are present in the recorded records which tend to obscure the recognition of the desired reflected signals. In order to minimize these extraneous vibrations, a number of systems have been proposed which include electrical tuning networks and the combination of signals received from a plurality of seismometers.

The present invention relates to an improved method of seismic exploration wherein the seismic records are transformed in a manner so that common reflections in a plurality of records are readily identifiable. This method involves establishing two electrical signals which are representative of the reflections received by at least two seismometers. The two signals are clipped to form third and fourth generally square wave signals, which are then summed to form a fifth signal. The fifth signal is transmitted through a full wave rectifier to control a gate circuit. One of the first signals is transmitted through a full wave rectifier and the gate circuit to one input of a signal multiplier. The second of the first signals is applied to the second input of the signal multiplier. The output of the multiplier preferably is filtered to provide a smooth output signal. It has been found that seismic signals transformed in accordance with this method provide a record which permits identification of desired reflections even in the presence of a large amount of random noise vibrations.

Accordingly, it is an object of this invention to provide a method of and apparatus for transforming seismic signals so that reflections from common subterranean formations are readily identifiable in a plurality of records.

Another object is to provide a method of seismic exploration which permits reflected vibrations to be identified in the presence of random noise vibrations.

A further object is to provide simplified apparatus for correlating seismic signals.

Other objects, advantages and features of this invention should become apparent from the following detailed description which is taken in conjunction with the accompanying drawings in which:

Figure 1 is a schematic representation of a seismic exploration procedure which can be employed to carry out the method of this invention.

Figure 2 is a schematic view of the recording and computing apparatus which can be employed to carry out this invention.

Figure 3 is an end view of one of the recording drums of Figure 2.

Figure 4 is a graphical representation of the clipping, summing, rectifying and gating steps of the method of this invention.

Figure 5 is a schematic circuit drawing of the computing apparatus employed to carry out the steps of Figure 4.

Figure 6:
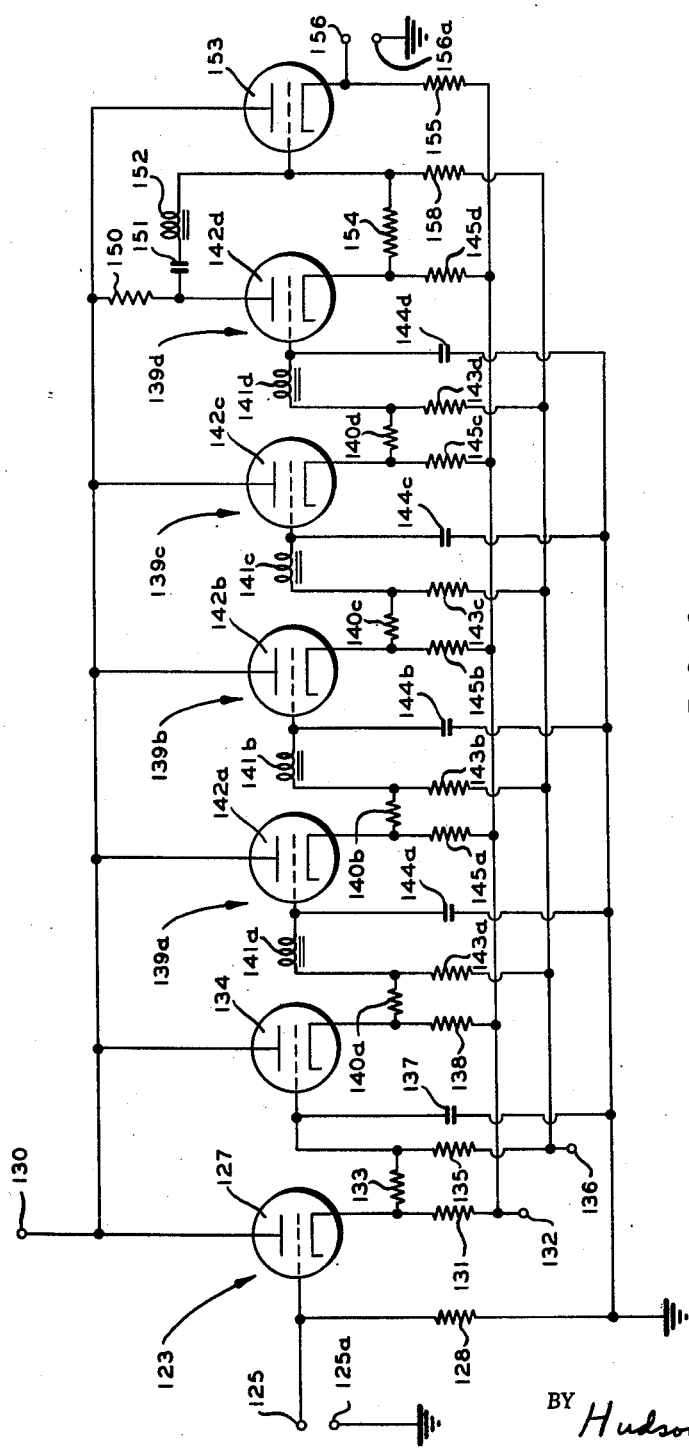
Figure 6 is a schematic circuit drawing of the interpolation filter of Figure 5.

Referring now to the drawing in detail and to Figure 1 in particular, there is shown a seismic exploration system. A first explosive charge 10 is detonated in a shot hole 11. Vibrations emitted from this explosive charge are reflected from a subterranean formation 12 and are received by a plurality of seismometers 13a, 13b, 13c, 13d, and 13e which are spaced from one another and from shot hole 11. The output signals from these five seismometers are combined by a summing amplifier 14 and applied to a recorder 15. A second explosive charge 17 is subsequently detonated in a shot hole 18 which is spaced from shot hole 11. Vibrations emitted from explosive charge 17 are reflected by formation 12 and received by a plurality of second seismometers 19a, 19b, 19c, 19d, and 19e which are spaced from shot hole 18 and from the first set of seismometers. The signals received by this second group of seismometers are combined by summing amplifier 20 and applied to a recorder 21. A third explosive charge 23 is then detonated in a shot hole 24 which is spaced from shot hole 18. The vibrations emitted from this explosive charge are reflected from the formation 12 and received at a plurality of third seismometers 25a, 25b, 25c, 25d, and 25e which are spaced from shot hole 24 and from the second group of seismometers. The signals received by this third group of seismometers are combined by a summing amplifier 26 and applied to a recorder 27.

In the method illustrated in Figure 1, it is desirable that the shot holes be spaced equidistant from one another along a common line. The groups of seismometers are similarly spaced from one another along the same line. This procedure simplifies the record combining processes of this invention, but is not essential, as is pointed out hereinafter in detail. The procedure described in conjunction with Figure 1 is repeated with explosive charges being detonated in sequence in series of shot holes spaced from shot hole 24. This invention will be described in conjunction with only three explosive charges in order to simplify the explanation and the drawing. However, in actual practice, a larger number of signals normally are obtained and combined.

A present preferred form of the recording and computing apparatus of this invention is illustrated schematically in Figure 2. It is desirable that the seismic signals be recorded initially on a magnetic tape because such a procedure enables the records to be manipulated readily. The recording apparatus of Figure 2 comprises drums 30, 31, and 32 which have magnetic tapes thereon and which are rotated by a motor 33. Although separate drums have been shown in the drawing, it should be evident that a single drum with a larger number of channels can be employed. The output signal from amplifiers 14, 20, and 26 of Figure 1 are connected by conductors 35, 36, and 37, respectively, to recording heads 38, 39, and 40 adjacent drum 30. Conductors 35, 36, and 37 have switches 41, 42, and 43, respectively, therein. The output signals of the three amplifiers 14, 20 and 26 are thus recorded initially on drum 30. In order to simplify the drawings, single conductors are illustrated. It should be evident that two conductors, or one conductor and ground, actually are employed.

It is desired that these three signals be summed to provide a composite record. Recording heads 38, 39, and 40 are connected by respective conductors 45, 46, and 47, which have respective switches 48, 49, and 50 therein, through respective isolating resistors 51, 52, and 53 to the inputs of a summing amplifier 54. The output of amplifier 54 is connected through a switch 55 and a conductor 56 to a recording head 57 adjacent drum 31. After the initial signals are recorded on drum 30, switches 41, 42, and 43 are opened and switches 48, 49, and 50 are closed. Drum 30 is rotated past heads 38, 39, and 40 which then function as reproducing heads so that the initial recorded signals are summed and recorded on drum 31. Switch 55 is closed at this time. The signal recorded on drum 31 is then combined with the individual signals originally recorded on drum 30 in accordance with the procedure of this invention. Head 57 of drum 31 is connected through conductor 56 and a switch 58 to the first input terminal of computing apparatus 59. Heads 38, 39, and 40 of drum 30 are connected by respective conductors 60, 61, and 62, which have respective switches 63, 64, and 65 therein, to the inputs of amplifiers 66, 67, and 68, respectively. The outputs of these amplifiers are connected to the second input of computing apparatus 59. The output of computing apparatus 59 is connected by conductors 70, 71, and 72, which have respective switches 73, 74, and 75 therein, to respective recording heads 76, 77, and 78 of drum 32.

The recording heads of drums 30 and 31 are adjustably mounted so that the signals originally recorded can be reproduced with selected time delays. This is illustrated schematically in Figure 3 where recording head 57 is shown attached to a curved support member 79 adjacent drum 31.

The method of this invention can be explained in conjunction with Figure 4. The several curves shown in Figure 4 represent electrical signals, having amplitudes plotted against time, that corresponds to the recorded and transformed seismic signals. Curve $b(t)$ represents the signal originally recorded on drum 31, for example. Curve $a(t)$ represents the signal originally recorded by head 38 on drum 30, for example. In Figure 4 the input signals $a(t)$ and $b(t)$ are each clipped to an equal degree to provide $a'(t)$ and $b'(t)$ which have equal peak heights. When the latter (clipped) signals are added a signal of zero value appears for those time intervals where the respective polarities of $a'(t)$ and $b'(t)$ are equal and opposite, as is demonstrated by their summed signal $a'(t)+b'(t)$. These zero values are carried over into the gate driving signal when the summed signal is rectified to provide the wave form $|a'(t)+b'(t)|$. Since the gate passes only that portion of the rectified $b$ signal, i.e., $|b(t)|$ which coincides in polarity with the driving signal, these zero values operate to produce the intermittent wave form shown as Gated $|b(t)|$. Of course, the gate can be adjusted so that it closes and passes zero signal at any desired point between the peak and the zero of the wave form $|a'(t)+b'(t)|$. This is a technique of changing the magnitude of the zero intervals in the output signal. The output signal is of the form Gated $|b(t)|$. This signal is then multiplied by signal $a(t)$. The product is filtered to provide a smooth output signal, not shown. As will become evident hereinafter, this process, when repeated, results in a series of transformed signals wherein common vibrations are readily identifiable.

The apparatus illustrated in Figure 5 is employed to carry out the steps illustrated in Figure 4. The computing apparatus is provided with first and second input terminals 80 and 80a, the latter being grounded. Terminal 80 is connected through resistors 82 and 83 to the input of an amplifier 84. The junction between resistors 82 and 83 is connected to ground through diodes 85 and 87 which are connected in opposition to one another. The computing apparatus is also provided with second input terminals 88 and 88a, the latter being grounded. Terminal 88 is connected through resistors 90 and 91 to the input of amplifier 84. At a junction between resistors 90 and 91 is a connection to ground through rectifiers 92 and 93 which are connected in opposition to one another.

The input signal $a(t)$ is applied between input terminals 80 and 80a. This signal is clipped by rectifiers 85 and 87 so that the signal $a'(t)$ is applied to amplifier 84. Rectifiers 85 and 87 can advantageously be silicon diodes. Silicon is a semi-conducting material so that the diodes have high resistance to the passage of current in one direction and low resistance to passage of current in the opposite direction. When the voltage across such a diode exceeds a predetermined value, the diode becomes conductive in both directions and substantially a constant voltage drop occurs across the diode. This permits the input signal to be clipped with regard to both polarities. Rectifiers 92 and 93 perform the same function on signal $b(t)$. The two clipped signals are applied through resistors 83 and 91 to the input of summing amplifier 84. Amplifier 84 preferably is a high gain electronic amplifier that is provided with a degenerative feedback resistor 84a. The output signal of amplifier 84 is thus representative of the sum of the signals $a'(t)$ and $b'(t)$.

The output of amplifier 84 is connected through a rectifier 95 to conductor 96. The output of amplifier 84 is also connected through a resistor 97 to the input of an amplifier 98 which is provided with a degenerative feedback resistor 98a. The output of amplifier 98 is connected through a rectifier 99 to conductor 96. Rectifiers 95 and 99 and phase reversal amplifier 98 thus constitute a full wave rectifier. The signal appearing at conductor 96 is representative of $|a'(t)+b'(t)|$.

This signal is employed to control the operation of a gate circuit. Rectifiers 100 and 101 are connected in series relationship with one another, and rectifiers 102 and 103 are connected in series relationship with one another and in parallel with rectifiers 100 and 101. The junction between rectifiers 100 and 102 is connected through resistors 104 and 105 to a positive potential terminal 106. The junction between resistors 104 and 105 is connected to ground through a resistor 107. The junction between rectifiers 101 and 103 is connected through resistors 108 and 109 to a negative potential terminal 110. The junction between resistors 108 and 109 is connected to ground through a resistor 111. Conductor 96 is connected through a rectifier 112 to the junction between rectifiers 100 and 102. Conductor 96 is also connected through a resistor 113 to the input of a phase reversal amplifier 114 which is provided with a degenerative feedback resistor 114a. The output of amplifier 114 is connected to the junction between rectifiers 101 and 103 through a rectifier 115 which is connected with polarity opposite the polarity of rectifier 112.

Input terminal 88 is also connected through a resistor 116 to the input of a phase reversal amplifier 117 which is provided with a degenerative feedback resistor 117a. The output of amplifier 117 is connected through a rectifier 118 to the junction between rectifiers 102 and 103. Terminal 88 is connected through a rectifier 119 to the junction between rectifiers 102 and 103. The junction between these rectifiers is connected to ground through a resistor 120. Terminal 80 is connected to the first input of a multiplier circuit 121. The junction between rectifiers 100 and 101 is connected to the second input of multiplier circuit 121 and to ground through a resistor 122.

Rectifiers 118 and 119 and phase reversal amplifier 117 form a full wave rectifier so that a signal $|b(t)|$ is applied to the input of the gate circuit. The gate circuit is operated by the potential at conductor 96 in a manner such that the signal from terminal 88 is transmitted through the gate circuit only during the time that the original input signals $a(t)$ and $b(t)$ are of the same polarity. For a more detailed description of the operation of such a gate circuit, reference is made to Proceedings of the IRE, January 1955, pages 29 to 37. The transmitted signal is multiplied by input signal $a(t)$ by multiplier circuit 121, which can be of the type described in Electronics, August 1956, page 182, for example. The output of multiplier circuit 121 is connected through a filter 123 to a first output terminal 124. The second output terminal 124a is connected to ground.

A suitable circuit for use as filter 123 is illustrated in Figure 6. The first input terminal 125 of this circuit is connected to the control grid of a triode 127. The second input terminal 125a is connected to ground. Terminal 125 is also connected to ground through a resistor 128. The anode of triode 127 is connected to a positive potential terminal 130, and the cathode of triode 127 is connected through a resistor 131 to a negative potential terminal 132. The cathode of triode 127 is connected through a resistor 133 to the control grid of a triode 134. The control grid of triode 134 is connected through a resistor 135 to a negative potential terminal 136 and to ground through a capacitor 137. The anode of triode 134 is connected to terminal 130, and the cathode of triode 134 is connected through a resistor 138 to terminal 132.

Four identical filter networks 139a, 139b, 139c, and 139d are connected in series relationship with one another to the output of triode 134. Network 139a comprises a resistor 140a and an inductor 141a which are connected in series relationship between the cathode of triode 134 and the control grid of a triode 142a. The junction between resistor 140a and inductor 141a is connected through a resistor 143a to terminal 136. The control grid of triode 142a is connected to ground through a capacitor 144a. The anode of triode 142a is connected to terminal 130, and the cathode of triode 142a is connected through a resistor 145a to terminal 132. Filter networks 139b, 139c, and 139d are identical to network 139a.

The anode of triode 142d is connected through a resistor 150 to terminal 130. The anode of triode 142d is also connected through a capacitor 151 and an inductor 152 to the control grid of a triode 153. The cathode of triode 142d is connected to the control grid of triode 153 through a resistor 154. The control grid of triode 153 is connected through a resistor 158 to terminal 136. The anode of triode 153 is connected to terminal 130, and the cathode of triode 153 is connected through a resistor 155 to terminal 132. The cathode of triode 153 is connected to the first output terminal 156 of the filter network. The second output terminal 156a is connected to ground.

The filter network illustrated in Figure 6 has a normal density function response. If a single input pulse is applied between terminals 125 and 125a, the output signal between terminals 156 and 156a represents the normal density curve, which is defined by the general expression:

$$E_0(t) = Ke^{-(xt)^2}$$

where $E_0(t)$ is the output voltage as a function of time, K is a constant relating to the energy loss through the filter, $t$ is time, $e$ is the base of natural logarithms, and $x$ is a constant relating to the width of the density curve. This filter is particularly effective in smoothing the output signal of multiplier 121 in order to provide a continuous signal, such as shown in the lowermost curve of Figure 4.

In one specific embodiment of filter 123, the following circuit components were employed:

Resistor: Ohms
- 131 _____ 5,600
- 138 _____ 5,600
- 145a _____ 5,600
- 145b _____ 5,600
- 145c _____ 5,600
- 145d _____ 5,600
- 155 _____ 5,600
- 128 _____ 470,000
- 133 _____ 1,000,000
- 135 _____ 8,200,000
- 143a _____ 8,200,000
- 143b _____ 8,200,000
- 143c _____ 8,200,000
- 143d _____ 8,200,000
- 158 _____ 8,200,000
- 140a _____ 180,000
- 140b _____ 180,000
- 140c _____ 180,000
- 140d _____ 180,000
- 154 _____ 180,000
- 150 _____ 5,600

Capacitor: Microfarads
- 137 _____ 0.05
- 144a _____ 0.031
- 144b _____ 0.015
- 144c _____ 0.0076
- 144d _____ 0.0047
- 151 _____ 0.003

Inductor: Henries
- 141a _____ 500
- 141b _____ 500
- 141c _____ 500
- 141d _____ 500
- 152 _____ 500

Terminal: Volts
- 130 _____ +150
- 132 _____ −12
- 136 _____ −90

Triodes: Type
- All _____ ½ 12AT7

In one specific embodiment of this invention, a series of eleven explosive charges are detonated in sequence in shot holes along a common line spaced approximately 300 feet from one another. Vibrations from each of these explosive charges are received by a total of eight seismometers which have their outputs summed by an amplifier, such as 14 in Figure 1 of the drawing. The eleven recorded signals normally contain considerable amounts of extraneous noise vibrations, as illustrated by respective curves 160 to 170 of Figure 7a which are reproductions of photographic traces of original recordings made in the Texas Panhandle. It can be seen that corresponding reflections are difficult, if not impossible, to identify in the eleven curves. These eleven signals are then summed to provide a single composite record, such as is illustrated by drum 31 of Figure 2. Each initial signal is then multiplied by the composite curve in the manner of this invention using the apparatus of Figure 5 so as to obtain the curves 160' to 170' which are shown in Figure 7b. It should be evident from an inspection of the curves of Figure 7b that the common reflections on the several curves are readily identifiable. The random noise vibrations are greatly reduced.

In order to simplify the explanation of the invention, it has been assumed that the several seismometer signals were obtained from vibrations of substantially equal travel paths. This invention is not restricted to such an exploration procedure, however. Signals representative of different lengths of travel paths can be combined by incorporating suitable delays at the time of the combination to compensate for different angularities. This can readily be accomplished by the adjustable recording and reproducing heads associated with the magnetic tape drums. Furthermore, it is usually necessary to compensate for differences in elevation and thicknesses of the weathered layer. This can also be accomplished by incorporating suitable delays in the original combination of records, as is well known by those skilled in the art. In the system illustrated in Figure 1, it is assumed that the seismometers associated with each amplifier are sufficiently close together that no corrections are needed for angularity of path. However, corrections can be made if the seismometers are spaced sufficiently far from one another to require such corrections.

While the invention has been described in conjunction with multiplying individual signals by the sum of a plurality of signals, such a procedure is not necessary. A first seismometer signal can be multiplied directly by a second to provide useful information in some situations. Furthermore, either signal can be represented by curve $a(t)$, for example. That is, either the individual signals or the sum can be $a(t)$ in the described example.

Figure 7A:
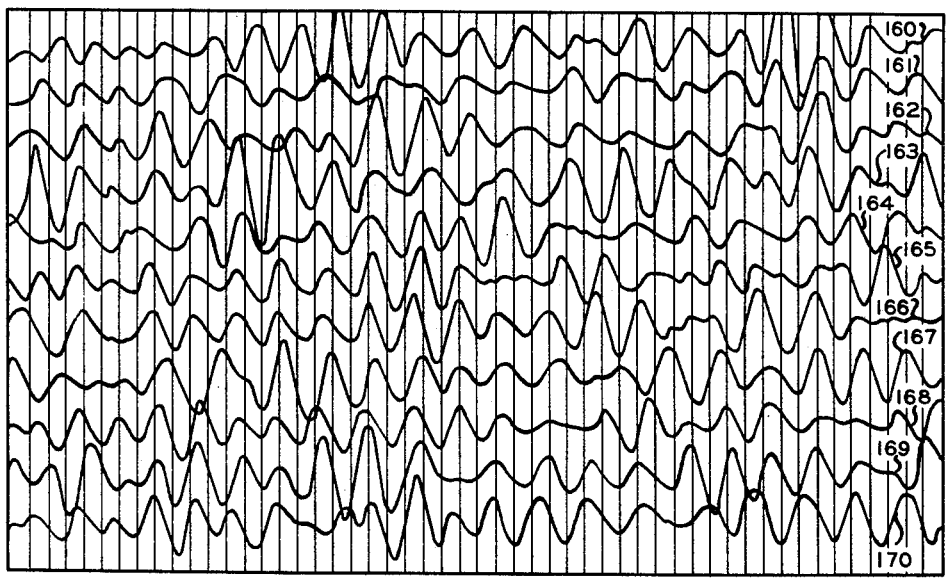
Figures 7a and 7b are graphical representations of original seismic signals and transformed signals obtained by the method of this invention, respectively.
Figure 7B:
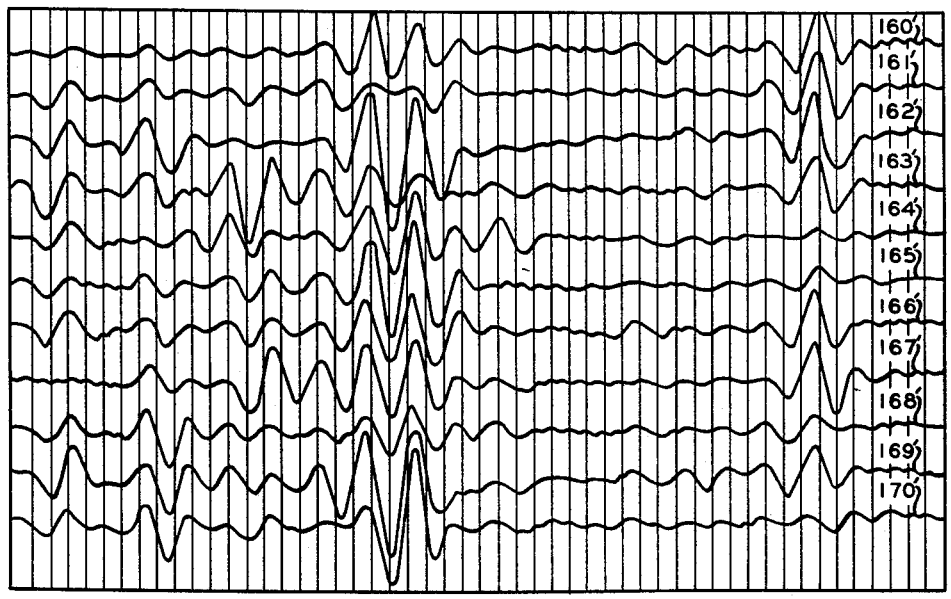

From an inspection of the curves of Figures 7a and 7b, it should be evident that the method of this invention greatly reduces the amount of extraneous noise in seismic signals so that common reflections can readily be identified. While the invention has been described in conjunction with present preferred embodiments, it should be evident that it is not limited thereto.

What is claimed is:

1. Seismic signal transforimng apparatus comprising means to establish a first electrical signal which varies in amplitude in accordance with vibrations received by a seismometer, means to establish a second electrical signal which varies in amplitude in accordance with vibrations received by a seismometer, means to clip said first signal to form a third signal of generally square wave configuration, means to clip said second signal to form a fourth signal of generally square wave configuration, means to sum said third and fourth signals to form a fifth signal, first full wave rectifying means, means to apply said fifth signal to said first rectifying means, thereby to form an output sixth signal, a gate circuit, second full wave rectifying means, means to apply one of said first and second signals to said second rectifying means, thereby to form an output seventh signal, means to apply said seventh signal to the input of said gate circuit, means actuating said gate circuit responsive to said sixth signal, and means to multiply the second of said first and second signals by the output signal of said gate circuit.

2. The apparatus of claim 1 wherein said first and second applying means each comprises a pair of semiconductor diodes connected in series bucking relationship between the sources of said first and second signals, respectively, and a point of reference potential.

3. The apparatus of claim 1 wherein said gate circuit comprises first and second rectifiers connected in series relationship, third and fourth rectifiers connected in series relationship with one another and in parallel with said first and second rectifiers, a source of potential, a first resistance element connected between one terminal of said source of potential and the junction between said first and third rectifiers, and a second resistance element connected between the second terminal of said source of potential and the junction between said second and fourth rectifiers, said sixth signal being applied between the junction between said first and third rectifiers and the junction between said second and fourth rectifiers, said seventh signal being applied between a reference potential and the junction between said third and fourth rectifiers, and the output signal of said gate circuit appeairng between said reference potential and the junction between said first and second rectifiers.

4. Seismic signal transforming apparatus comprising means to sum two electrical signals, first means to apply a first electrical signal to the input of said means to sum, second means to apply a second electrical signal to the input of said means to sum, first signal clipping means connected to said first means, second signal clipping means connected to said second means, a first full wave rectifier, means connecting the output of said means to sum to the input of said first rectifier, a gate circuit, a second full wave rectifier, means connecting the input of said second rectifier to one of said first and second means, means connecting the output of said first rectifier to said gate circuit to control same, a signal multiplier, means connecting the output of said gate circuit to one input of said multiplier, and means connecting the other of said first and second means to the second input of said multiplier.

5. The apparatus of claim 4 further comprising a filter connected to the output of said multiplier to provide a smooth signal, and means to record the output signal of said filter.

6. Seismic signal transforming apparatus comprising means to sum two electrical signals, first means to apply a first electrical signal to the input of said means to sum, second means to apply a second electrical signal of amplitude equal to said first electrical signal to the input of said means to sum, a first full wave rectifier, means connecting the output of said means to sum to the input of said first rectifier, a gate circuit, a second full wave rectifier, means connecting the input of said second rectifier to one of said first and second means, means connecting the output of said first rectifier to said gate circuit to control same, a signal multiplier, means connecting the output of said gate circuit to one input of said multiplier, and means connecting the other of said first and second means to the second input of said multiplier.

7. Seismic signal transforming apparatus comprising means to establish a first electrical signal which varies in amplitude in accordance with vibrations received by a seismometer, means to establish a second electrical signal which varies in amplitude in accordance with vibrations received by a seismometer, means to clip said first signal to form a third signal of generally square wave configuration, means to clip said second signal to form a fourth signal of the generally square wave configuration and having amplitudes equal to those of said third signal, means to sum said third and fourth signals to form a fifth signal, first full wave rectifying means, means to apply said fifth signal to said first rectifying means, thereby to form an output sixth signal, a gate circuit, second full wave rectifying means, means to apply one of said first and second signals to said second rectifying means, thereby to form an output seventh signal, means to apply said seventh signal to the input of said gate circuit, means opening said gate circuit responsive to said sixth signal, and means to multiply the second of said first and other signals by the output signal of said gate circuit.

8. Seismic signal transforming apparatus comprising means to establish a first electrical signal which varies in amplitude in accordance with vibrations received by a seismometer, means to establish a second electrical signal which varies in amplitude in accordnace with vibrations received by a seismometer, means to clip said first signal to form a third signal of generally square wave configuration, means to cilp said second signal to form a fourth signal of generally square wave configuration, means to sum said third and fourth signals to form a fifth signal, means energized by said fifth signal to form a sixth signal representative of the absolute value of said fifth signal, a gate circuit, means energized by one of said first and second signals to form a seventh signal representative of the absolute value of said one signal, means to apply said seventh signal to the input of said gate circuit, means actuating said gate circuit responsive to said sixth signal, and means to multiply the other of said first and second signals by the output signal of said gate circuit.

9. Seismic signal transforming apparatus comprising means to sum a plurality of seismometer signals to provide a first electrical signal representative of the sum of a plurality of vibrations received by seismometers, means to establish a second electrical signal which varies

9 in amplitude in accordance with vibrations received by a seismometer, means to clip said first signal to form a third signal of generally square wave configuration, means to clip said second signal to form a fourth signal of generally square wave configuration, means to sum said third and fourth signals to form a fifth signal, first full wave rectifying means, means to apply said fifth signal to said first rectifying means, thereby to form an output sixth signal, a gate circuit, second full wave rectifying means, means to apply one of said first and second signals to said second rectifying means, thereby to form an output seventh signal, means to apply said seventh signal to the input of said gate circuit, means actuating said gate circuit responsive to said sixth signal, and means to multiply the second of said first and second signals by the output signal of said gate circuit.

10

10. The apparatus of claim 9 further comprising a filter connected to the output of said means to multiply to provide a smooth signal, and means to record the output signal of said filter.

References Cited in the file of this patent

UNITED STATES PATENTS

| 2,620,890 | Lee | Dec. 9, 1952 |
| 2,768,372 | Green | Oct. 23, 1956 |
| 2,794,965 | Yost | June 4, 1957 |

OTHER REFERENCES

Brooks et al.: "The Review of Scientific Instruments," March 1952 (pp. 121–126).

---

UNITED STATES PATENT OFFICE

CERTIFICATE OF CORRECTION

Patent No. 2,926,331            February 23, 1960

Joe P. Lindsey

It is hereby certified that error appears in the printed specification of the above numbered patent requiring correction and that the said Letters Patent should read as corrected below.

Column 3, line 43, for "corresponds" read -- correspond --; column 7, line 24, for "transforimng" read -- transforming --; line 66, for the syllable "peairng" read -- pearing --; column 8, line 48, for "second" read -- other --; line 49, for "other" read -- second --; line 55, for "accordnace" read -- accordance --; same column 8, line 58, for "cilp" read -- clip --.

Signed and sealed this 30th day of August 1960.

(SEAL)
Attest:

ERNEST W. SWIDER
Attesting Officer

ROBERT C. WATSON
Commissioner of Patents

UNITED STATES PATENT OFFICE
CERTIFICATE OF CORRECTION

Patent No. 2,926,331                  February 23, 1960

Joe P. Lindsey

It is hereby certified that error appears in the printed specification of the above numbered patent requiring correction and that the said Letters Patent should read as corrected below.

Column 3, line 43, for "corresponds" read -- correspond --; column 7, line 24, for "transforimng" read -- transforming --; line 66, for the syllable "peairng" read -- pearing --; column 8, line 48, for "second" read -- other --; line 49, for "other" read -- second --; line 55, for "accordnace" read -- accordance --; same column 8, line 58, for "cilp" read -- clip --.

Signed and sealed this 30th day of August 1960.

(SEAL)
Attest:

ERNEST W. SWIDER  
Attesting Officer

ROBERT C. WATSON  
Commissioner of Patents